United States Patent
Ostrobrod

(10) Patent No.: US 9,874,034 B2
(45) Date of Patent: Jan. 23, 2018

(54) ANTI-PANIC CABLE GRAB

(71) Applicant: Meyer Ostrobrod, Philadelphia, PA (US)

(72) Inventor: Meyer Ostrobrod, Philadelphia, PA (US)

( * ) Notice: Subject to any disclaimer, the term of this patent is extended or adjusted under 35 U.S.C. 154(b) by 0 days.

(21) Appl. No.: 15/066,167

(22) Filed: Mar. 10, 2016

(65) Prior Publication Data

US 2017/0260762 A1    Sep. 14, 2017

(51) Int. Cl.
| | |
|---|---|
| *B65H 59/16* | (2006.01) |
| *B65H 59/18* | (2006.01) |
| *B65H 59/28* | (2006.01) |
| *E04G 21/32* | (2006.01) |
| *E06C 7/18* | (2006.01) |
| *A62B 35/00* | (2006.01) |
| *F16D 63/00* | (2006.01) |

(52) U.S. Cl.
CPC ...... *E04G 21/3204* (2013.01); *A62B 35/0081* (2013.01); *E06C 7/186* (2013.01); *F16D 63/008* (2013.01)

(58) Field of Classification Search
CPC   A62B 1/14; A62B 35/04; E06C 7/186; Y10T 24/394; F16G 11/10; B65H 2701/31; B66D 3/10
USPC ............... 188/65.1, 65.2; 182/3, 5, 191, 230
See application file for complete search history.

(56) References Cited

U.S. PATENT DOCUMENTS

| | | | | |
|---|---|---|---|---|
| 3,179,994 | A * | 4/1965 | Meyer ..................... | A62B 1/14 182/3 |
| 3,811,155 | A * | 5/1974 | Stafford .................. | A62B 1/14 182/5 |
| 4,034,828 | A * | 7/1977 | Rose ........................ | A62B 1/14 182/5 |
| 4,077,094 | A * | 3/1978 | Swager ................... | A62B 1/14 182/5 |
| 5,156,240 | A * | 10/1992 | Ostrobrod ............... | A62B 1/14 182/193 |
| 5,855,251 | A * | 1/1999 | Deuer ..................... | A62B 1/14 182/192 |
| 5,924,522 | A * | 7/1999 | Ostrobrod ............... | A62B 1/14 182/191 |
| 6,056,086 | A * | 5/2000 | Gortan .................... | A62B 1/14 182/197 |

* cited by examiner

*Primary Examiner* — Robert A Siconolfi
*Assistant Examiner* — San Aung
(74) *Attorney, Agent, or Firm* — Norman E. Lehrer

(57) ABSTRACT

The cable grab safety device releasably attaches a workman's safety lanyard to a steel cable. A primary frame constructed of an elongated U-shaped bracket having a pair of spaced apart parallel side plates fits around the cable. A secondary frame also comprised of a pair of side plates fits within the U-shaped bracket after the cable is inserted. The secondary frame carries a brake in the form of a pulley mounted in an elongated slot movable toward or away from the cable. A lever attached to a worker's lanyard moves the pulley only in the inward direction to engage the cable in the event of a fall. A bent pin connected between the primary and secondary frames allows for limited pivotal and axial movement between them allowing the cable to be inserted into the U-shaped bracket. A separate locking pin secures the frame members together.

9 Claims, 3 Drawing Sheets

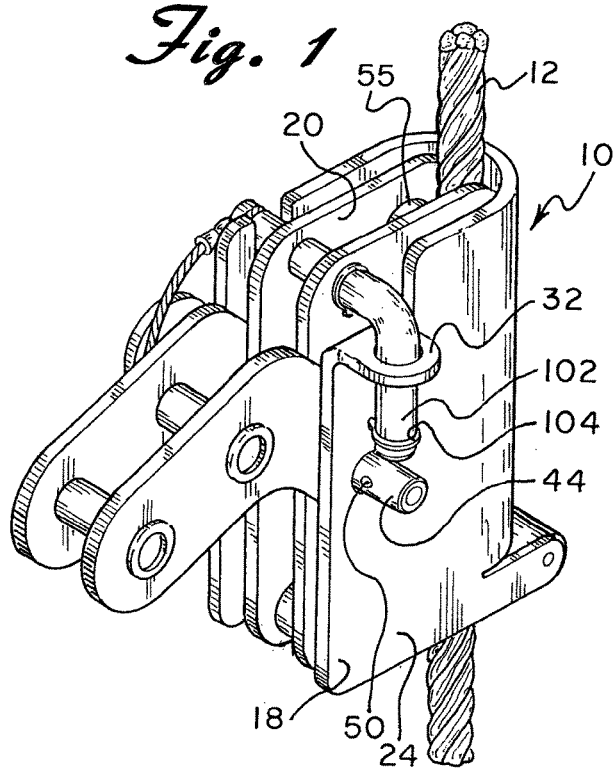
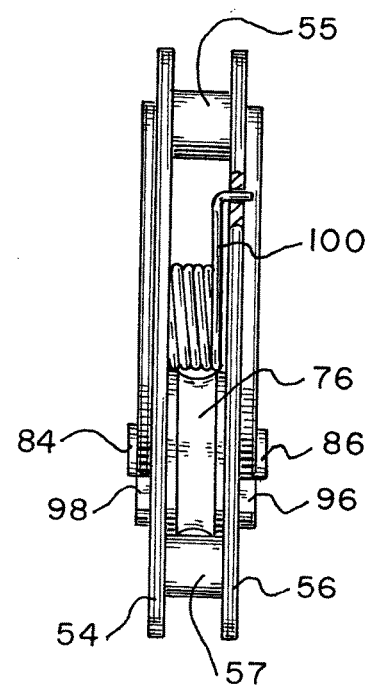
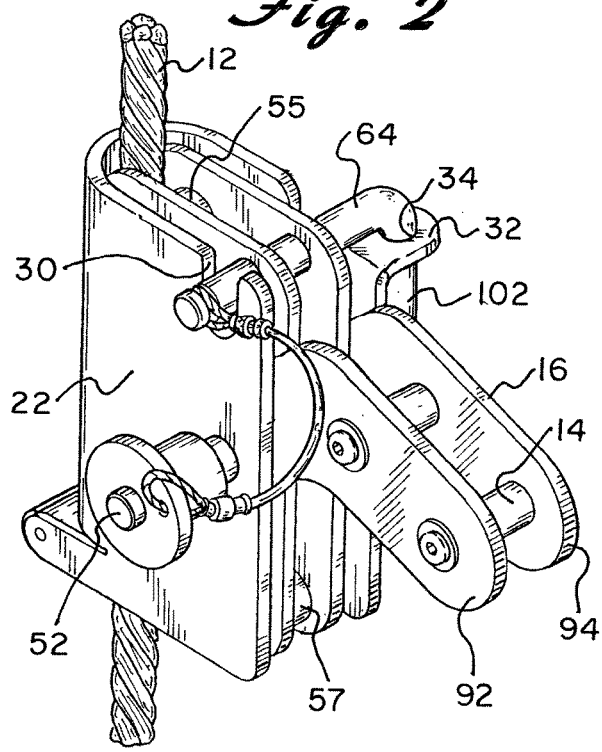
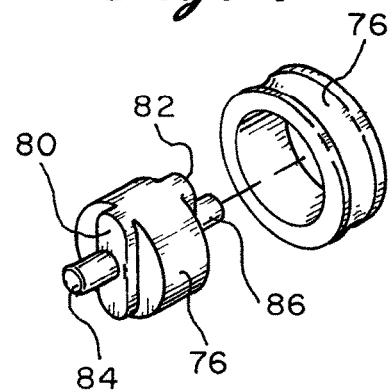

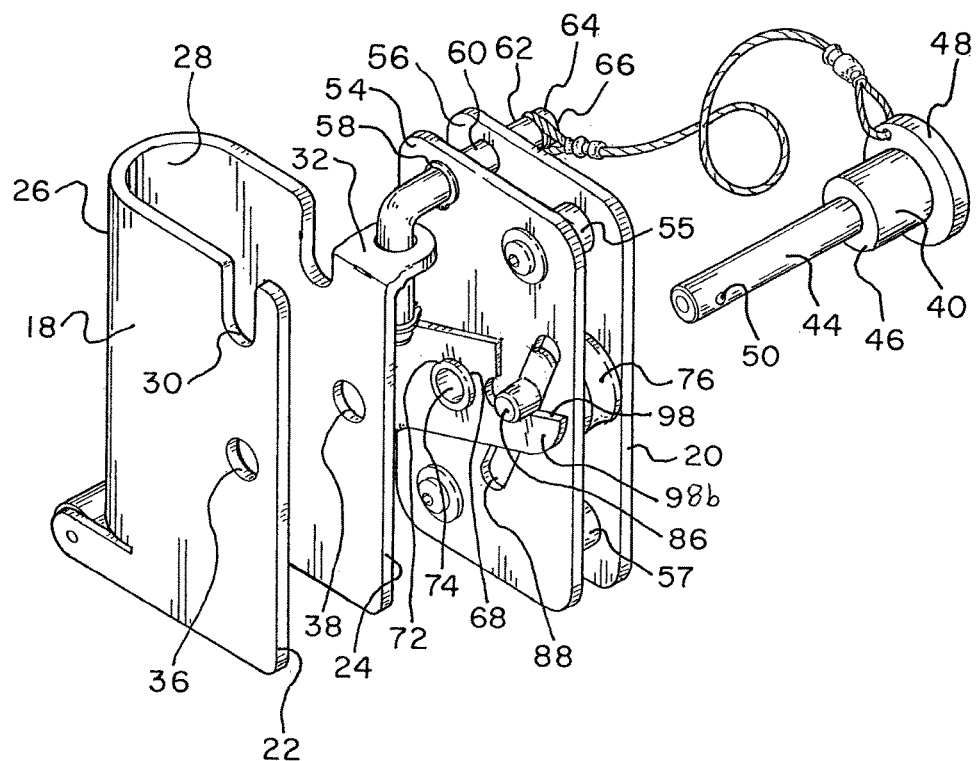
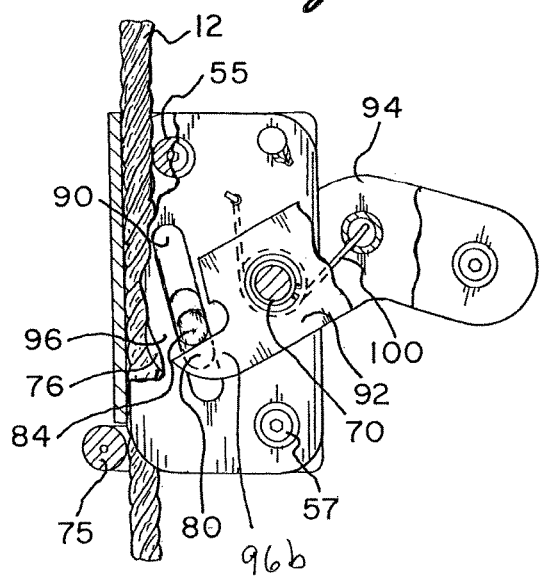

ANTI-PANIC CABLE GRAB

FIELD OF THE INVENTION

The present invention is directed toward a cable grab safety device and, more particularly, toward such a device which is intended to be used by a workman working in elevated places which allows him to freely move up or down but which will gradually and safely arrest his fall should he slip or otherwise fall from his work place. The invention is an improvement on Applicant's prior U.S. Pat. No. 5,924, 522 entitled Cable Grab, the entire contents of which are incorporated herein by reference.

BACKGROUND OF THE INVENTION

As explained in Applicant's above identified patent, in response to government rules and regulations and a general desire for safety, rope or cable grabs or similar safety devices have become a requirement for workers working in elevated positions such as on scaffolding or on ladders or the like. Such rope or cable grabs are used in conjunction with a vertical cable or rope which is suspended from a position above the worker to substantially the ground level where it is also secured so as to ensure that the rope or cable is maintained in a vertical position.

Typical rope or cable grabs are used in conjunction with a safety belt or harness which is fastened about the worker. A lanyard is secured to the safety belt or harness and the free end thereof is secured to the rope or cable grab. The lanyard is relative short but is of sufficient length to allow the worker some freedom of movement in horizontal directions. An ideal rope or cable grab should move freely up and down the rope or cable as the worker slowly moves up or down. However, in the event that the worker loses his balance or otherwise is caused to fall, the lanyard causes the rope or cable grab to grip the rope or cable. This breaks the fall by gripping the rope or cable which first slows the worker and eventually stops the fall within several feet.

As is more fully explained in Applicant's prior U.S. Pat. No. 5,156,240 entitled Rope Grab, prior art rope grab devices have proven less than totally acceptable for several different reasons. Some types of rope grabs cannot be attached to or removed from the rope without the necessity of threading the end of the rope through the connector. This is not practical when the suspended rope is several hundred feet long. Hinging and clamping arrangements have been proposed as a solution to this problem but none of them has been found to be entirely satisfactory. The hinged device shown in prior U.S. Pat. No. 4,560,029, for example, has been known to deform upon stopping the fall of a fallen worker which deformation makes it difficult to operate safely thereafter.

Prior known devices and, particularly those of the hinged type, are also not easy to assemble on the rope or cable. Assembly frequently requires a two-hand operation and, quite frequently, a worker working at an elevated position normally only has one hand free.

Another disadvantage found in many conventional rope or cable grab devices is that they cannot be moved freely up or down the rope or cable when the worker moves about. Many of these devices require that the worker hold the device in an open position with a hand grip in order to move the same. This may be difficult when the worker's hands are otherwise occupied. Furthermore, in the event of a fall, the worker may panic and may not release his grip which would cause the rope or cable grab to malfunction and which would, of course, be disastrous to him.

Another serious problem of prior rope grab devices is the manner in which the rope grab grips the rope. The gripping mechanism of most rope grabs includes a cam-lever arrangement wherein a braking cam having teeth or serrated cam surfaces grips the cable. The force at which the cams grab the rope of these prior art devices is directly related to the weight of the worker and the short distance that he free falls before the rope grab is activated. The result is that the sudden stop can injure the worker.

Furthermore, in safety tests required by law or regulations in many jurisdictions, where a weight simulating a worker was dropped a short distance to simulate a fall, the suspended rope which may be a ⅝ or ¾ inch nylon or manila rope was either broken or substantially weakened by the rope grab because of the sudden shock upon it and the cutting of the rope by the braking cams. The Occupational Safety and Health Administration (OSHA) has established standards which must be met for rope grabs and ropes used therewith. These are published at 29 CFR 1910 Appendix C. Many prior art devices, however, are not capable of meeting these requirements.

The rope grab described in Applicant's prior U.S. Pat. No. 5,156,240 is believed to have solved most of the problems of prior art rope grabs and has been commercially successful in the marketplace. It has been found, however, that Applicant's rope grab cannot be used with steel cable due inter alia to the serrated nature of the gripping teeth. While rope is commonly used in indoor environments and for temporary outdoor use, steel cable is required in most outdoor operations in view of the durability of the same.

The primary purpose of the invention described in Applicant's U.S. Pat. No. 5,924,522 was to provide a safety device that could be used with a steel cable since the rope grab of Applicant's U.S. Pat. No. 5,156,240 was not useful with the same. Applicant's improved cable grab has been very successful. However, an additional potential problem has been recognized.

Unlike prior safety devices described above, Applicant's devices (as explained the patents) can move up and down freely under normal conditions. However, should a workman fall, the cable grab slows the fall and then stops it entirely. As explained in the patent, squeezing the cable grab with the workman's hand releases the break. During the beginning of a fall, it is possible for a workman to panic and grab onto the cable grab which would inadvertently release the brake creating a very dangerous situation as the workman may continue to fall.

There is, therefore, a need for a cable grab that will safely and automatically prevent a workman from falling but which cannot be rendered inoperable should a workman intentionally or unintentionally grab onto the same in the event of a fall.

SUMMARY OF THE INVENTION

The present invention is designed to overcome the problems of the prior art devices described above and provides a cable grab safety device which releasably attaches a workman's safety belt or harness lanyard to a vertically extending safety steel cable or the like. The device includes a primary frame assembly constructed of an elongated U-shaped bracket having a pair of spaced apart parallel side plates which is adapted to fit around the cable. A secondary frame assembly also comprised of a pair of side plates is adapted to fit within the U-shaped bracket after the cable is inserted. The secondary frame assembly carries a brake mechanism in the form of a pulley mounted in an elongated slot so as to be movable toward or away from the cable and a lever adapted to be attached to a worker's lanyard for moving the pulley so as to engage the cable in the event of a fall. However, the lever does not have the ability to move the pulley away from the cable. An elongated bent pin connected between the primary and secondary frame assemblies allows for limited pivotal and axial movement between them to thereby allow the cable to be inserted into the U-shaped bracket. A separate locking pin passes through aligned openings in the primary and secondary frame members to secure them together.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown. In order to best understand the improvement of the present invention, the first seven figures illustrate the cable grab invention of Applicant's prior patent while FIGS. 8 and 9 illustrate the improvement thereto.

FIG. 1 is a front right side perspective view of a cable grab constructed in accordance with the prior invention as the same is used on a vertically suspended steel safety cable;

FIG. 2 is a front left side perspective view of the cable grab shown in FIG. 1;

FIG. 6 is a front elevational view of the mechanism illustrated at the right in FIG. 3 but with the lever shown in its raised position;

FIG. 7 is an exploded view of the brake pulley utilized with the prior invention;

FIG. 8 is a view similar to FIG. 3 but showing the improvement of the present invention, and FIG. 9 is a view similar to FIG. 4 showing the improvement.

DETAILED DESCRIPTION OF THE PREFERRED EMBODIMENT

Figure 3:
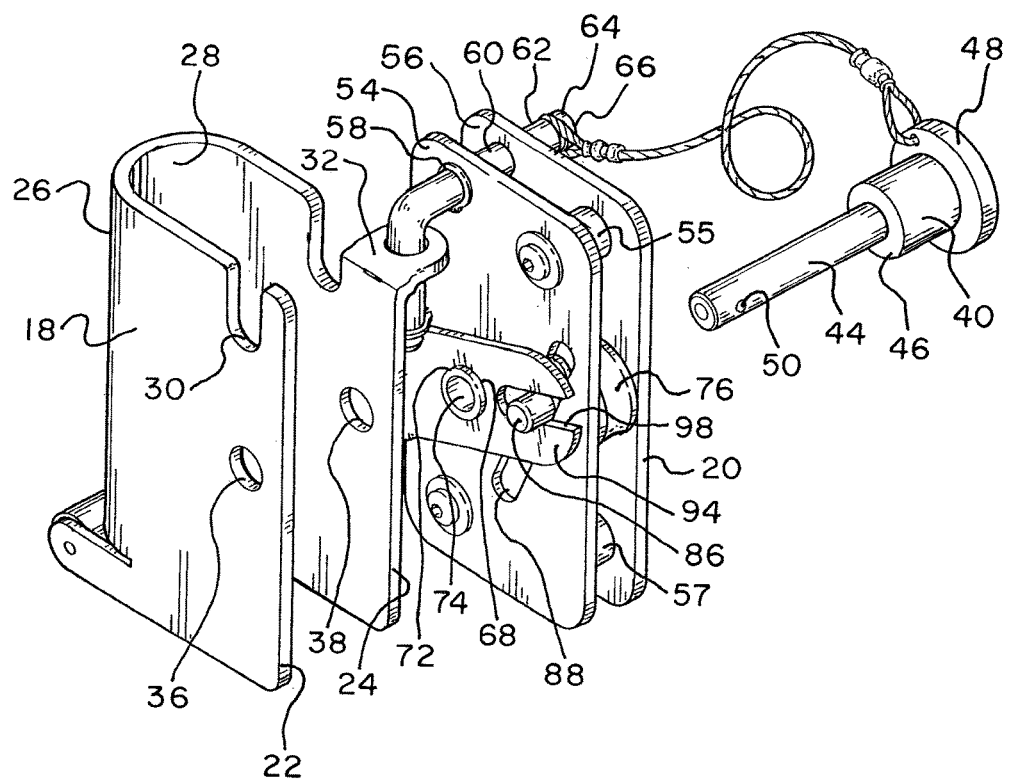
FIG. 3 is a perspective view of the cable grab with the parts thereof separated and showing the details of the same.

In order to best understand the present invention, it is believed that a description of Applicant's prior cable grab invention is necessary. This is the invention shown in U.S. Pat. No. 5,924,522.

Referring to the drawings in detail wherein like reference numerals have been used throughout the various figures to designate like elements, there is shown in FIG. 1 the prior cable grab safety device constructed in accordance with the principles of the prior invention and designated generally as 10. Cable grab 10 is shown in place on a vertically extending steel safety cable 12. Cable 12 may be only 25 or 50 feet long or may be hundreds of feet long. While steel is the material from which most safety cables are made, it is also possible to produce them from other metals and alloys. The cables normally have a diameter of 5/16 to 3/8 inch, although the thickness of the cable 12 and other specifications concerning the same are regulated by federal regulations and the regulations in several states. Furthermore, and as will be made clearer below, the cable grab 10 is preferably designed to be used with a particular size cable. That is, various different sizes of cable grabs may be made available for different size cables.

As is well known in the art, the cable grab is connected to a worker who may be working on a scaffold or platform or ladder or the like at an elevated location through the use of a lanyard (not shown) which may be relatively short or up to 42 inches long in accordance with OSHA requirements. The lanyard is connected to the worker through a safety belt or harness worn by the worker. The other end of the lanyard is connected to the cable grab 10 by attaching the same to the rod 14 carried at the end of the brake lever 16, the details of which will be explained more fully hereinafter.

The length of the lanyard allows the worker to move in a horizontal direction to either side of the safety cable 12. As the worker moves higher, the lanyard pulls up on the brake lever 16 which, in turn, pulls the entire cable grab 10 upwardly with the worker. As long as the lanyard is above the height of the cable grab 10, the weight of the main portion of the cable grab maintains the lever 16 in its upward position so that the entire cable grab can freely move downwardly along the safety cable 12 as the worker descends slowly. Of course, should the worker fall, the lever 16 will move downwardly into its braking position and the cable grab 10 will arrest the fall of the worker. The details of the brake function of the cable grab 10 will be explained in more detail below.

Cable grab 10 is comprised essentially of two parts: a primary frame assembly 18 and a secondary frame assembly 20. Primary frame assembly 18 is comprised essentially of an elongated U-shaped bracket having a pair of parallel side plates 22 and 24 which are spaced apart a distance sufficient to receive cable 12 therebetween. The rear end of each of the side plates 22 and 24 are joined together along the entire vertical length thereof by a curved connecting portion 26 having an interior surface 28.

A vertically extending notch 30 is formed in the top edge of the side plate 22 adjacent the forward end thereof. The upper forward end of the side plate 24 is bent outwardly 90 degrees to form a tab 32. A vertical opening 34 is formed in the tab 34 in substantial alignment therewith with the notch 30 in the side plate 22.

Side plates 22 and 24 are also provided with aligned openings 36 and 38, respectively. Openings 36 and 38 are located below the notch 30 and tab 32. The primary frame assembly 18 also carries a locking pin 40 which is suspended from the remaining parts of the device by way of a short, flexible wire 42. Wire 42 allows the locking pin 40 to be inserted into place and removed without losing the same. Locking pin 40 includes an elongated barrel portion 44 which is adapted to pass through the openings 36 and 38. A stop member 46 located between the barrel portion 44 and the head 48 of the pin 40 limits the extent to which the pin 40 can be inserted through the openings 36 and 38.

As is best seen in FIG. 2, when the pin 40 is in place, a portion of the same remains exposed adjacent the outer surface of the wall 22. This distance is sufficient to permit the worker's fingers to be inserted between the head 48 of the pin 40 and the wall 22. Pin 40 is held in place by a spring-loaded ball 50 located on the circumference of the barrel 44 adjacent the free end thereof. When the pin 40 is in the position shown in FIG. 1, the remote end of the barrel 40 extends past the wall 24 and the ball 50 is exposed thereby functioning as a lock to prevent the pin from being pulled out. When it is desired to remove the pin, button 52 in the head 48 is depressed thereby allowing the ball 50 to move inwardly and preventing the same from functioning as a lock. Locking pins such as that shown at 40 are, per se, known. Accordingly, it is not believed that a detailed explanation of the internal operation thereof is necessary.

Figure 4:
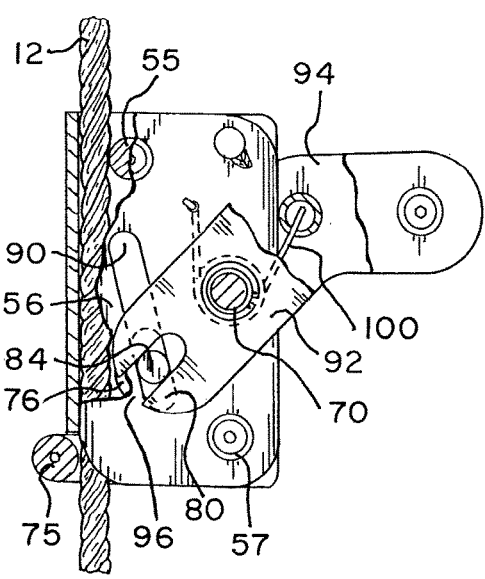
FIG. 4 is a view shown partially in cross section of the interior of the cable grab shown in FIG. 1 and showing the manner in which the cable grab can freely move up and down on the vertical safety cable.

The secondary frame assembly 20 is comprised of a second pair of parallel spaced apart side plates 54 and 56 which are joined together through upper and lower bolt and spacer combinations 55 and 57, respectively. As shown most clearly in FIGS. 1 and 2, the secondary frame assembly 20 is adapted to fit within the U-shaped bracket of the primary frame assembly 18. As shown in FIG. 4, the forward end of the secondary frame assembly 20 is essentially in alignment with the front of the walls 22 and 24 while a small space remains between the secondary frame assembly 20 and the interior surface 28 of the rear wall 26. This space and the space between the side plates 54 and 56 is large enough to allow the cable 12 to pass freely therethrough.

As shown most clearly in FIGS. 1-3, the upper portion of each of the plates 54 and 56 includes an opening therein as shown at 58 and 60, respectively. The horizontal portion 62 of a bent or L-shaped rod 64 extends through the openings 58 and 60 and extends outwardly a short distance from either side thereof. Preferably, the end of the flexible wire 42 is attached to the free end 66 of the rod 64.

Openings 68 and 70 are similarly formed in the side plates 54 and 56, respectively, adjacent the front end thereof. A bushing 72 having an opening 74 is fitted into the openings 68 and 70 and is secured thereto. As shown most clearly in FIGS. 3-5, brake lever 16 is pivotally secured to the bushing 72 for limited rotation about the same. When assembled, the openings 36, 38 and 74 are in alignment with each other and are maintained in their assembled condition by the pin 40 as shown in FIGS. 1 and 2.

Figure 5:
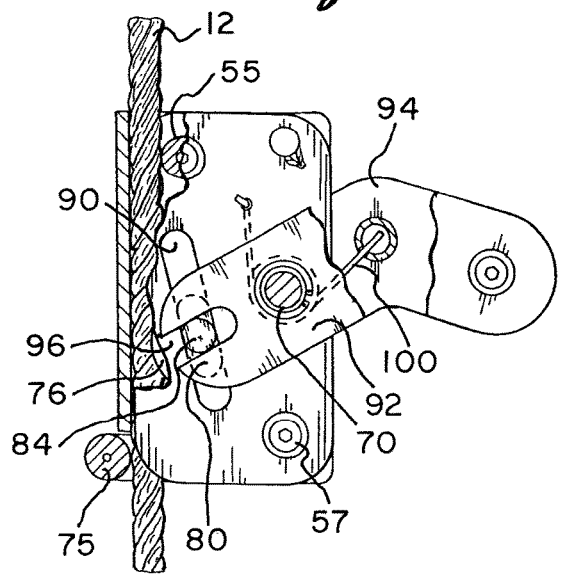
FIG. 5 is a view similar to FIG. 4 but showing the cable grab in its braking condition.

As shown most clearly in FIGS. 3, 4 and 5, the cable grab 10 functions as a brake when a workman falls by having the lever 16 move the pulley wheel 76 rearwardly against the cable 12. This forces the cable against the inner wall 28. There will, of course, be some slippage which is desirable so as to avoid a sudden shock but after the cable grab moves for several feet, eventually it will function to brake the worker's fall. As is also clear from FIGS. 4 and 5, the cable 12 is guided through the cable grab 10 through the use of the lower roller 75 and the upper spacer 55. These prevent the cable 12 from binding on the sharp rearward edges of the cable grab 10.

The pulley roller 76 is mounted for rotation on a substantially cylindrically shaped axle member 78. Axle member 78 includes a pair of elongated bushing members 80 and 82 that are parallel to each other and extend outwardly from the outer side faces of the axle member 78 as most clearly shown in FIG. 7. Extending outwardly and substantially centrally located from the bushing member 80 is an axially aligned pin 84. A similar pin 86 extends outwardly from the bushing member 82.

The pulley roller 76 and its associated axle assembly 78 are located between the parallel side plates 54 and 56 of the secondary frame assembly 20. As best seen in FIGS. 3-5, the side plate 54 includes an elongated slot 88 formed therethrough and a similar slot 90 is formed in the side plate 56. These slots are angled so that the top portion is closer to the rear or cable edge of the secondary frame assembly 20 and the lower portion is closer to the forward edge of the assembly. The width of each of the slots 88 and 90 is slightly greater than the width of the bushings 80 and 82 but the length of the slots is approximately twice the length of the bushing members. Thus, the axle assembly 78, which has the bushing members 80 and 82 extending into the slots 88 and 90, can move up and down the slots but cannot rotate therein. The side edges of each of the bushing members 80 and 82 essentially contact the inner walls of the slots 88 and 90 as the axle member 78 and the pulley roller 76 riding thereon move up and down. Obviously, as the combined axle member 78 and pulley roller 76 moves up or down, it also moves toward or away from the cable 12.

The pins 84 and 86 extending from the bushings 80 and 82 extend outwardly passed the outer faces of the plates 54 and 56. The brake lever 16 is actually formed of two spaced apart lever members 92 and 94 that are each pivotally secured to the bushings 72 for rotation. The inwardmost ends of each of the lever members 92 and 94 are bifurcated in that they each include a slot 96 and 98, respectively, therein forming upper and lower tongs 96a and 96b on member 92 and upper and lower tongs 98a and 98b on member 94. The tongs 96a and 96b and 98a and 98b engage the pins 84 and 86 so as to move the pulley roller 76 upwardly and outwardly as shown in FIG. 5 or downwardly and inwardly as shown in FIG. 4. A spring member 100 is used to bias the lever 16 in the position shown in FIG. 5 with the pulley 76 pressing slightly against the cable 12.

The L-shaped rod member 64 also includes a vertically extending portion 102. This vertical extension is adapted to pass down through the opening 34 in the tab 32. The interfit between the rod 64 and the tab 32 allows the rod to rotate about its vertical axis along with the remaining parts of the secondary frame assembly 20 and also permits the same to move up and down. Only limited vertical motion is allowed, however, due to the stop means formed by the spring clip 104.

When the secondary frame assembly 20 is properly fitted into the primary frame assembly 18 as shown in FIGS. 1 and 2, the end of the horizontal portion 62 of rod 64 fits down into the notch 30 of the side wall 22 and 24 and the opening 74 in the bushing 72 is in alignment with the openings 36 and 38 in the side walls 22 and 24. In this position, the pin 40 can be inserted through these openings to lock the parts together.

FIGS. 4 and 5 illustrate cross sections of the center of the cable grab in operation. It can be seen that when the free end of the lever 16 is raised, the pulley roller 76 is held away from the cable 12 so that the cable grab can move up and down the length of the cable 12 without restriction. In the event of a fall, however, the free end of the lever 16 is pulled downwardly so that the roller 76 engages the cable 12 and forces the same against the inner wall 28 to arrest the worker's fall.

In order to prevent the roller 76 from putting excess force on the cable 12, a stop mechanism is provided. More particularly, the bushing members 80 and 82 have only limited movement in their respective slots 88 and 90. In its full downward or braking position the tops of the bushing members 80 and 82 engage the tops of the slots 88 and 90 to thereby limit the movement of the roller 76 into the cable 12.

It should be noted that the size and dimensions of the roller 76, the size and location of the bushings 80 and 82 and the size of the primary frame assembly 18 are all specifically designed to accommodate a particular size cable 12. In other words, if a larger cable is used, then the space between the roller 76 and the interior surface 28 of the U-shaped member must be made larger. Similarly, if a smaller cable is used, then a smaller opening must be provided. In each case, the dimensions are chosen so as to permit the cable grab to first decelerate the falling worker by gradually slowing him within a predetermined limited distance and then stopping him but without the roller 76 having unlimited movement into the cable 12.

As pointed out above, spring 100 biases the lever in a downward direction wherein the roller 76 would tend to engage the cable 12. However, the leaf spring 100 has a relatively weak force and is easily overcome by the slightest upward tension on the lanyard attached to the rod 14 at the free end of the lever 16. This allows the worker to ascend or descend with the cable grab moving along with him and without the need for the worker to manually handle the cable grab 10.

The manner in which the cable grab 10 is assembled or disassembled on or from the cable 12 is clearly describe in Applicant's U.S. Pat. No. 5,156,240, the entire subject matter of which is hereby incorporated herein by reference. It is, therefore, not believed that a detailed description thereof is necessary.

As pointed out above, the only possible problem with the cable grab described above is caused by a workman who may panic in the event of a fall. The workman may instinctively grasp for the cable grab device and pull the free end of the lever 16 upwardly. This may be done unintentionally or it may be caused intentionally based on the workman's failure to remember how the device operates. In any event, such movement of the lever would prevent the roller 76 from moving toward the cable 12 to stop the workman's fall. The workman would essentially be disabling the safety features of the cable grab device.

To prevent the foregoing from occurring, the upper tongs 96a and 98a have been removed from the inward most ends of the lever members 92 and 94. This improvement is shown in FIGS. 8 and 9. As should be readily apparent to those skilled in the art, because of this improvement, if the free ends of the levers 92 and 94 are inadvertently moved upwardly causing the inward most ends to move downwardly, there is nothing to move the pins 84 and 86 downwardly. As a result, the roller 76 will not be moved downwardly out of the braking position and the cable grab will work as it was intended to.

The present invention may be embodied in other specific forms without departing from the spirit or essential attributes thereof and accordingly reference should be made to the appended claims rather than to the foregoing specification as indicating the scope of the invention.

I claim:

1. A safety device for the attachment of a safety belt lanyard to a vertically extending safety cable comprising:
   a primary frame assembly comprised of an elongated U-shaped bracket having a pair of parallel side plates spaced apart a distance sufficient to receive a cable therebetween, said side plates being joined together along a length thereof by a connecting portion having an interior surface;
   a secondary frame assembly comprised of a second pair of parallel spaced apart side plates, said secondary frame assembly being adapted to fit within said U-shaped bracket and spaced from said interior surface;
   a brake means mounted to said secondary frame assembly between said second pair of side plates for slideable movement toward and away from said interior surface, and
   lever means adapted to move said brake means and extending outwardly from said primary frame assembly to be connected to said lanyard, said lever means being capable of moving said brake means only toward said interior surface.

2. The safety device as claimed in claim 1 further including means mounting said secondary frame assembly to said primary frame assembly to allow both rotational movement about an axis of rotation and longitudinal axial movement between said frame assemblies, and means for locking said secondary frame assembly to said primary frame assembly with said secondary frame assembly fitted within said U-shaped bracket.

3. The safety device as claimed in claim 2 wherein said locking means comprises aligned openings in each of the side plates of said primary and secondary frame assemblies and an elongated pin adapted to extend through said openings.

4. The safety device as claimed in claim 3 including means for preventing said pin from being removed from said openings.

5. The safety device as claimed in claim 2 wherein said mounting means includes an L-shaped rod member including a horizontal portion carried by said secondary frame assembly, the free vertical leg of said rod being pivoted to the exterior surface of one of said side plates of said primary frame assembly.

6. The safety device as claimed in claim 5 wherein the upper edge of one of said side plates of said primary frame assembly includes a notch therein and wherein the end of the horizontal portion of said rod member is adapted to fit within said notch.

7. The safety device as claimed in claim 1 wherein said brake means includes a roller adapted to engage said cable and press the same against said interior surface.

8. The safety device as claimed in claim 7 including means for limiting the movement of said brake toward said interior surface.

9. The safety device as claimed in claim 1 further including spring means biasing said brake means toward said interior surface.

* * * * *